United States Patent

Nomura

Patent Number: 5,757,306
Date of Patent: May 26, 1998

[54] VECTOR QUANTIZATION WITH A CONTROL CIRCUIT FOR INPUT AND PREDICTED VECTOR QUANTIZATION

[75] Inventor: Toshiyuki Nomura, Tokyo, Japan

[73] Assignee: NEC Corporation, Tokyo, Japan

[21] Appl. No.: 517,766

[22] Filed: Aug. 22, 1995

[30] Foreign Application Priority Data

Aug. 22, 1994 [JP] Japan ..................... 6-196565

[51] Int. Cl.⁶ ........................................ H03M 7/00
[52] U.S. Cl. ................................ 341/200; 348/414
[58] Field of Search ................ 341/200; 348/414, 348/418, 422

[56] References Cited

U.S. PATENT DOCUMENTS 4,965,580  10/1990  Tasaki et al. ................. 341/200
5,241,383  8/1993  Chen et al. ................. 348/405

FOREIGN PATENT DOCUMENTS 291700   3/1990  Japan.
6-165158  6/1994  Japan.

*Primary Examiner*—Howard L. Williams
*Attorney, Agent, or Firm*—Sughrue, Mion, Zinn, Macpeak & Seas, PLLC

[57] ABSTRACT

In a vector quantizer device including an input vector quantizer (11) for a current input vector of an input vector sequence to produce a first quantized vector and a predicted vector quantizer (13) responsive to the input vector sequence for quantizing into a second predicted vector a predicted vector predictive of the current input vector with quantization, a predicting unit (37) produces the predicted vector in response to a predetermined number of output vectors including such first and second quantized vectors. Responsive to a prediction error vector between the current input and the predicted vectors, a control circuit (35) controls, at a time, input and output switches (31, 33) to supply the input vector sequence to only one selected quantizer of the input and the predicted vector quantizers and to produce as one of the output vectors one of the first and the second quantized vectors that is produced by the selected quantizer. The first and the second quantized vectors are produced as two of the output vectors when the prediction error vector is greater and smaller than a threshold value, respectively.

13 Claims, 4 Drawing Sheets

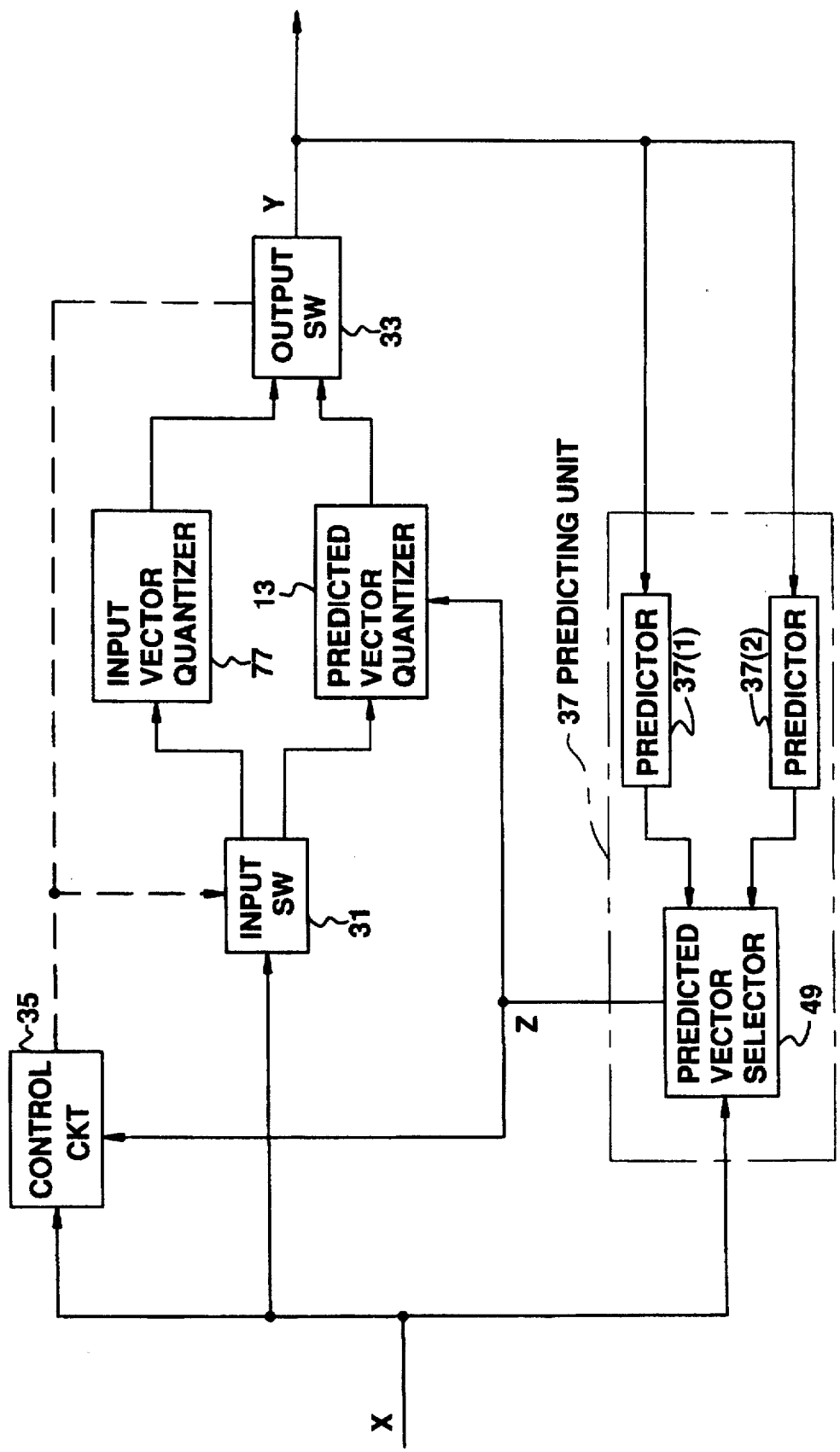

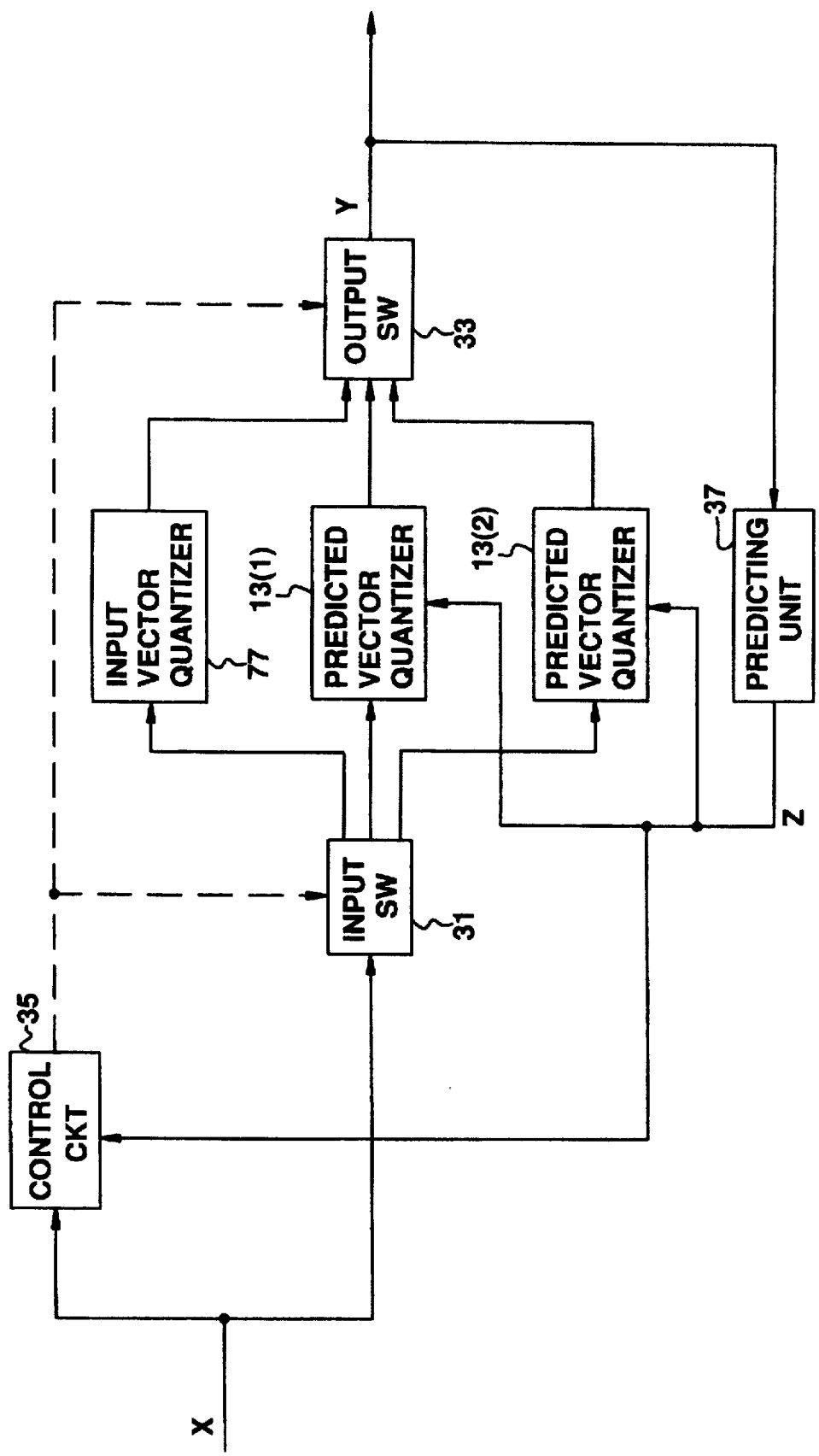

VECTOR QUANTIZATION WITH A CONTROL CIRCUIT FOR INPUT AND PREDICTED VECTOR QUANTIZATION

BACKGROUND OF THE INVENTION

This invention relates to vector quantization of quantizing an input vector sequence into an output sequence of output vectors and, more particularly, to a vector quantizer device for use in an encoder/decoder device either in transmitting the output sequence to a communication network or in storing the output sequence on a recording medium This invention furthermore relates to a vector quantizing method of quantizing the input vector sequence into the output sequence.

The input vector sequence comprises input vectors representative of an input signal which may be an audio or a video signal. Input vector quantization and predicted vector quantization have been known in transmission and storage of the audio and/or the video signal with an excellent efficiency. At each time instant, one of the input vectors is taken into consideration and is called a current input vector.

In the manner which will later be described in greater detail, a conventional vector quantizer device is disclosed as a "quantizer/dequantizer" in Japanese Patent Prepublication (A) No. 91,703 of 1990. In the conventional vector quantizer device, an input vector quantizer quantizer the current input vector into a first quantized vector. A prediction error quantizer quantizes a prediction error vector into a second quantized vector. A device output circuit produces the first and the second quantized vectors as two of the output vectors in the output sequence.

Responsive to the input vector sequence and past output vectors of the output sequence, a predictor unit predicts the current input vector with quantization as a predicted vector. The prediction error vector is calculated by using the input vector sequence and the predicted vector. It is consequently possible to understand the prediction error quantizer as a predicted vector quantizer responsive to the input vector sequence for quantizing the predicted vector into the second quantized vector.

The first and the second quantized vectors are accompanied by first and second quantization distortions. Comparing the first and the second quantization distortions with each other, the device output circuit produces as one of the two of output vectors one of the first and the second quantized vectors that has a smaller quantization distortion.

It is understood from the foregoing that the device output circuit selects one of the first and the second quantized vectors which are actually produced by the input and the predicted vector quantizers. The input and the predicted vector quantizers must therefore be kept always in operation. This results in an increased amount of calculation.

It may be mentioned here that the input vector sequence comprises a steadily variable region and a widely variable region.

The predicted vector may be very similar and be dissimilar to the current input vector in the steadily and the widely variable regions, respectively. The first quantization distortion may, however, be greater than the second quantization distortion. Under the circumstances, the second quantized vector is less exactly representative of the current input vector and is nevertheless selected as one of the output vectors. This results in a reduced reliability of the output sequence and in a vague basis of selection of this one of the output vectors by the device output circuit to bring about an overlapped portion where some of the input vectors overlapp on one another for quantization seemingly desirably by the input and the predicted vector quantizers.

It is a preferred practice to use an input vector codebook for input vector quantization code vectors in the input vector quantizer and a prediction error codebook for prediction error quantization code vectors in the predicted vector quantizer. The vague basis necessitates use of adjacent input vector and prediction error quantization code vectors for the current input and the predicted vectors. This results in a deteriorated performance of the vector quantizer device. Incidentally, it will later become clear that the first and the second quantized vectors are preferably called primary and secondary quantized vectors depending on the circumstances.

SUMMARY OF THE INTENTION

It is therefore a principal object of the present invention to provide a vector quantizing method of quantizing an input vector sequence into an output sequence of output vectors, which method comprises the steps of quantizing a current input vector of the input vector sequence into a first quantized vector, quantizing a predicted vector predictive of the current input vector with quantization into a second quantized vector, and producing the first and the second quantized vectors as two of the output vectors and which method is operable with a reduced amount of calculation.

It is another principal object of this invention to provide a vector quantizing method which is of the type described and in which only one of the input and the predicted vector quantizing steps is in operation at each time instant.

It is still another principal object of this invention to provide a vector quantizing method which is of the type described and which gives a high reliability to the output sequence.

It is yet another principal object of this invention to provide a vector-quantizing method which is of the type described and in which a clear basis is used in the producing step.

It is a different principal object or this invention to provide a vector quantizer device which carries out a vector quantizing method of the type described.

It is a subordinate object of this invention to provide a vector quantizing method which is of the type described and which is operable with a raised performance.

It is another subordinate object of this invention to provide a vector quantizer device for a vector quantizing method of the type described.

Other objects of this invention will become clear as the description proceeds.

In accordance with an aspect of this invention, there is provided a vector quantizing method of quantizing an input vector sequence into an output sequence of output vectors, comprising the steps of: (a) quantizing a current input vector of the input vector sequence into a primary quantized vector, (b) quantizing in response to the input vector sequence a predicted vector into a secondary quantized vector, and (c) producing the primary and the secondary quantized vectors as two of the output vectors, wherein the vector quantizing method further comprises the steps of: (A) predicting at each time instant the current input vector with quantization as the predicted vector in response to a predetermined number of the output vectors produced before the time instant; (B) producing a control signal in response to the input vector sequence and the predicted vector; (C) using the input vector sequence in a selected quantizing step of the input and the predicted vector quantizing steps in response to the control signal; and (D) the quantized vector producing step being the step of producing in response to the control signal and at the time instant as one of the two of output vectors one of the primary and the secondary, quantized vectors that is produced by the selected quantizing step.

In accordance with a different aspect of this invention, there is provided a vector quantizer device which is for quantizing an input vector sequence into an output sequence of output vectors and which comprises: (a) input vector quantizing means for quantizing a current input vector of the input vector sequence into a primary quantized vector, (b) predicted vector quantizing means responsive to the input vector sequence for quantizing a predicted vector into a secondary quantized vector, and (c) device output means for producing the primary and the secondary quantized vectors as two of the output vectors, wherein the vector quantizer device further comprises: (A) predicting means for predicting at each time instant the current input vector with quantization as the predicted vector in response to a predetermined number of the output vectors produced before the time instant; (B) a control circuit responsive to the input vector sequence and the predicted vector for producing a control signal; and (c) an input switch responsive to the control signal for supplying the input vector sequence to selected quantizing means of the input and the predicted vector quantizing means; (D) the device output means and being an output switch responsive to the control signal for producing at the time instant as one of the two of output vectors one of the primary and the secondary quantized vectors that is produced by the selected quantizing means.

BRIEF DESCRIPTION OF THE DRAWING

FIG. 3 is a block diagram of a vector quantizer device according to a second embodiment of this invention; and FIG. 4 is a block diagram of a vector quantizer device according to a third embodiment of this invention:

DESCRIPTION OF THE PREFERRED EMBODIMENTS

Figure 1:
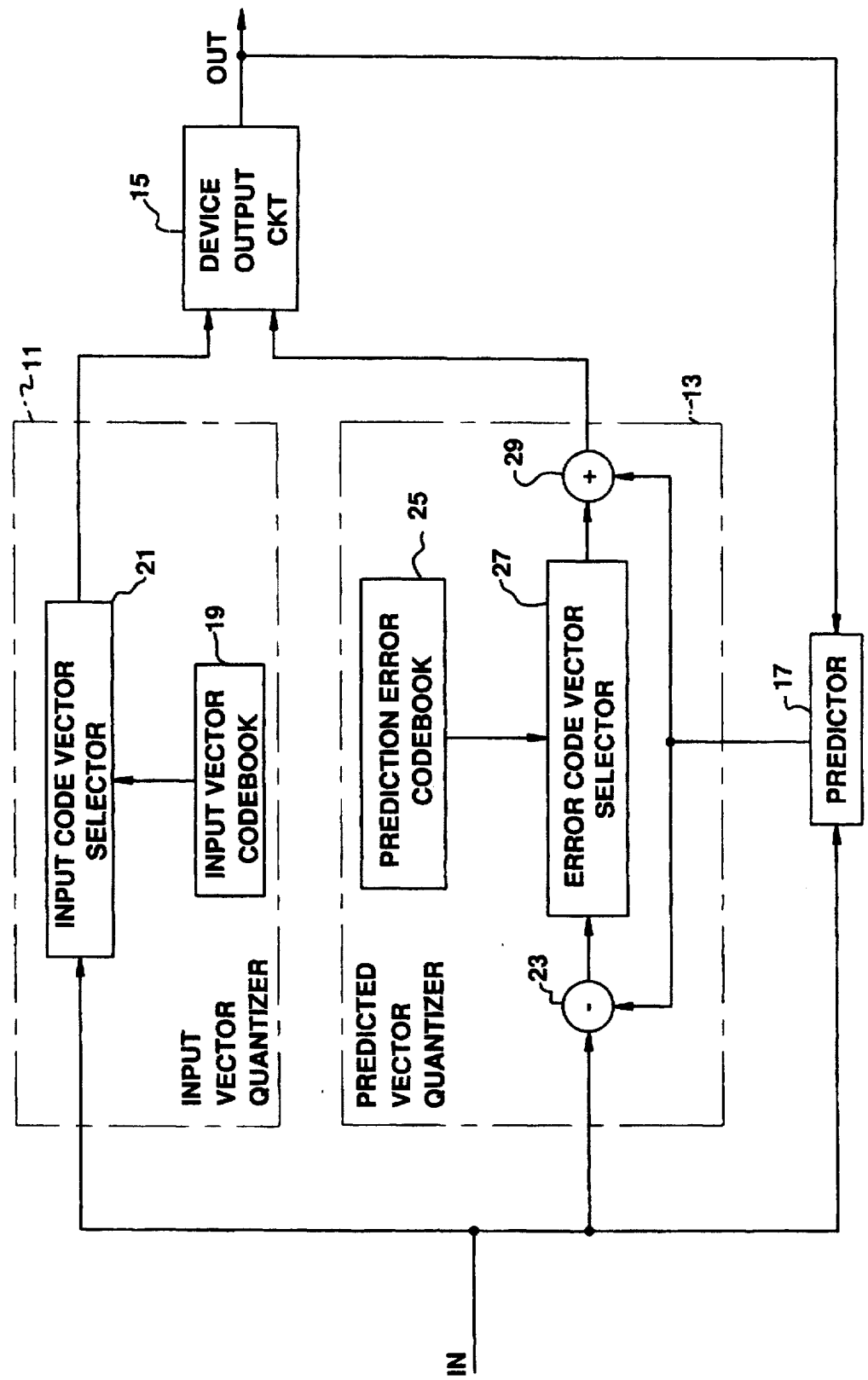
FIG. 1 is a block diagram of a conventional vector quantizer device.

Referring to FIG. 1, a conventional vector quantizer device will first be described in order to facilitate an understanding of the present invention. This vector quantizer device is like a vector quantizer device in general for use in quantizing an input vector sequence IN into an output sequence OUT of output vectors and is based on the disclosure of Japanese Patent Prepublication cited heretobefore.

The input vector sequence is a time sequence of input vectors representative of an input signal, such as an audio or a video signal. When the audio signal is used as the input signal, the input vectors represent audio signal segments into which the audio signal is segmented. Alternatively, the input vectors represent parameters of a spectral envelope of the audio signal. When the video signal is used as the input signal, the input vectors represent small blocks into which picture elements of the video signal are divided.

In the vector quantizer device depicted in FIG. 1, an input vector quantizer 11 quantizes into a first quantized vector a current input vector of the input vector sequence supplied thereto. In the manner which will far later be discussed, a predicted vector quantizer 13 is supplied with the input vector sequence and a predicted vector and quantizes the predicted vector into a second quantized vector. A device output circuit 15 produces the first and the second quantized vectors as two of the output vectors. These two of the output vectors may or may not be two consecutive ones of the output vectors.

A predictor unit 17 is supplied with the input vector sequence and past output vectors which are produced by the device output circuit 15 before a time instant at which the current input vector is delivered to the input and the quantized vector quantizers 11 and 13. The predictor unit 17 predicts the current input vector with quantization as the predicted vector. The input and the predicted vector quantizers 11 and 13 are consequently kept in operation at each time instant, one in connection with the current input vector and the other as regards the predicted vector. This gives rise to an increased amount of calculation.

The first and the second quantized vectors are accompanied by first and second quantization distortions. Comparing the first and the second quantization distortions with each other, the device output circuit 15 selects as one of the two of output vectors one of the first and the second quantized vectors that has a smaller quantization distortion. It may therefore appear that the output sequence is produced with a least possible quantization distortion.

The device output circuit 15 is however, liable to select as described hereinabove the second quantized vector which has the smaller quantization distortion and is nevertheless quantized from the predicted vector which is dissimilar to the current input vector. If this happens to occur, the output sequence has a reduced reliability.

Referring more particularly to FIG. 1, the input vector quantizer 11 comprises an input vector codebook 19 which keeps a plurality of preliminarily designed input vector quantization code vectors. An input code vector selector 21 is supplied with the input vector sequence and with the input vector quantization code vectors. Calculating input vector distances between the current input vector and the input vector quantization code vectors, the input code vector selector 21 selects as the first quantized vector one of the input vector quantization code vectors that has a shortest input vector distance relative to the current input vector.

The predicted vector quantizer 13 comprises a subtracter 23 for subtracting the predicted vector from the current input vector to produce a prediction error vector. A prediction error codebook 25 keeps a plurality of prediction error quantization code vectors. An error code vector selector 27 is supplied with the prediction error vector and the prediction error quantization code vectors. Calculating error vector distances between the prediction error vector and the prediction error quantization code vectors, the error code vector selector 27 selects as a quantized error vector one of the prediction error quantization code vectors that has a shortest error vector distance to the prediction error vector. An adder 29 adds the predicted vector to the quantized error vector to produce the second quantized vector.

It is described also hereinabove that the input vector sequence has a steadily variable region and a widely variable region where the input vectors relatively little and widely vary with time. The predicted vector quantizer 13 is believed to be effectively and ineffectively operable for the steadily and the widely variable regions of the input vector sequence. This results in an ambiguity in operation of the device output circuit 15 and furthermore results between the steadily and the widely variable regions in an overlapped portion where some of the input vectors overlap on one another so that quantization of these input vectors is seemingly equally desirable by the input and the predicted vector quantizers 11 and 13 in view of similarity between the current input and the predicted vectors.

For storage in the input vector and the prediction error codebooks 19 and 25, the input vector and the prediction error quantization code vectors are designed so as to minimize the quantization distortion and so as to correspond to respective small regions into which the steadily and the widely variable regions are subdivided in consideration of their distribution. As a result, the input vector and the prediction error quantization code vectors are adjacently designed in the overlapped portion. This deteriorates performance of the vector quantizer device.

Figure 2:
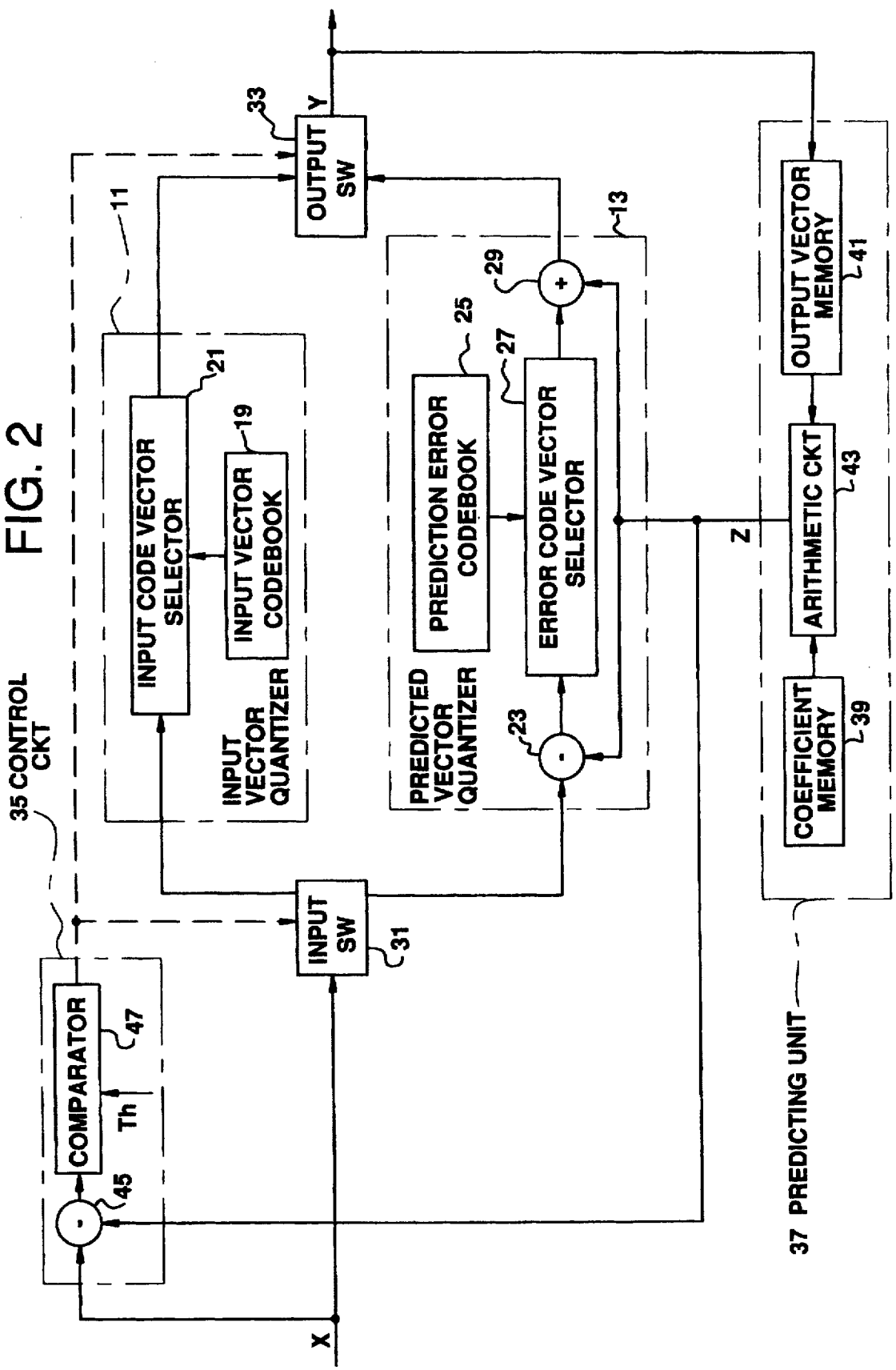
FIG. 2 is a block diagram of a vector quantizer device according to a first embodiment of the instant invention.

Referring now to FIG. 2, the description will proceed to a vector quantizer device according to a first preferred embodiment of this invention. Similar parts are designated by like reference numerals and are similarly operable with likewise named signals.

Such similar parts are as follows. The input vector quantizer 11 comprises the input vector codebook 19 and the input code vector selector 21. The predicted vector quantizer 13 comprises the subtracter 23, the prediction error codebook 25, the error code vector selector 27, and the adder 29.

The input vector sequence IN is, however, indirectly supplied to the input and the predicted vector quantizers 11 and 13. More particularly, an input switch 31 selects only one of the input and the predicted vector quantizers 11 and 13 as a selected quantizer at a time to selectively supply the input vector sequence to the selected quantizer. Similarly, the output sequence OUT of output vectors is selectively produced through an output switch 33, which corresponds to the device output circuit 15 described in conjunction with FIG. 1. The input and the output switches 31 and 33 are controlled by a control circuit 35. In place of the predictor unit 17 described in connection with FIG. 1, a predicting unit 37 is used. It is now understood that each of the input and the predicted vector quantizers 11 and 13 is operable as the selected quantizer only when supplied with each input vector of the input vector sequence through the input switch 31, which serves as a quantizer selecting unit.

Structure and operation of the predicting unit 37 will first be described. Let the input vector sequence comprise first, second, ..., t-th, and other input vectors $X(1)$, $X(2)$, ..., $X(t)$, and so forth, where t represents a positive integer indicative of a t-th time instant among consecutive time instants of a time interval which depends on the input signal to be usually different between the audio and the video signals. It will be presumed that the t-th input vector is the current input vector described before and without loss of generality that a t-th output vector $Y(t)$ is produced in the output sequence at the t-th time instant through the output switch 33.

The predicting unit 37 comprises a coefficient memory 39 in which a predetermined number P of prediction coefficient matrices $A(1)$, $A(2)$, ..., and $A(P)$ are preliminarily stored. The predetermined number is alternatively called a prediction degree. Each coefficient matrix is preliminarily designed as a p-th coefficient matrix $A(p)$ depending on the input signal and is a $K \times K$ matrix, where p is variable between 1 and P, both inclusive, and K represents the dimension of each output vector.

In the predicting unit 37, an output vector memory 41 is for holding at each time instant first through P-th output vectors which are produced through the output switch 33 before the time instant under consideration. At the t-th time instant, the first through the P-th output vectors may be $Y(t-1)$, $Y(t-2)$, ..., and $Y(t-P)$ in a reversed order of time. Each of such first through P-th output vectors will be referred to as a p-th output vector $Y(t-p)$.

Connected to the coefficient and the output vector memories 39 and 41, an arithmetic circuit 43 calculates a summation of first through P-th products with a p-th product calculated as regards the p-th coefficient matrix and the p-th output vector. The summation is produced at the t-th time instant as a t-th predicted vector $Z(t)$ predictive of the t-th input vector. It should be noted here that the predicted vector is produced in response to a finite number of the output vectors, each of which is a quantized vector. Such predicted vectors are consequently predictive of the input vectors of the input vector sequence with quantization from time to time. When represented by an equation, the t-th predicted vector is given as follows $$Z(t) = \sum_{p=1}^{P} A(p)Y(t-p).$$

Supplied with the input vector sequence and the predicted vector produced at each time instant by the predicting unit 37, the control circuit 35 produces a control signal delivered to the input and the output switches 31 and 33 through control connections depicted by dashed lines. In the control circuit 35, a vector subtracter 45 subtracts the predicted vector to produce a prediction error vector from one of the input vectors of the input vector sequence that is predicted with quantization by the predicted vector in question. A judging comparator 47 compares the prediction error vector with a threshold value Th to produce the control signal. When the prediction error vector is greater than the threshold value, the control signal selects the input vector quantizer 11 as the selected quantizer. When the prediction error vector is equal to or smaller than the threshold value, the control signal selects the predicted vector quantizer 13 as the selected quantizer. It is therefore possible to understand the control circuit 35 as a judging circuit for judging for control of the input and the output switches 31 and 33 whether or not the predicted vector correctly predicts the input vector at each time instant.

In the manner described in the foregoing, the judging circuit 35 judges at each time instant which of the input and the predicted vector quantizers 11 and 13 is more effective in operation of the vector quantizer device. In compliance with this judgment, one alone of the input and the predicted vector quantizers 11 and 13 is put in operation as the selected quantizer. This reduces the amount of calculation.

Inasmuch as only one of the input and the predicted vector quantizers 11 and 13 is in operation at a time, no overlapped portion appears between the steadily and the widely variable regions of the input vector sequence. It is therefore possible to preliminarily design the input vector quantization code vectors and the prediction error quantization code vectors so as to minimize the first and the second quantization distortions with no regards to the overlapped portion and to make the control or judging circuit 35 produce the control signal with only the prediction error vector taken into account. This raises the performance of the vector quantizer device. Incidentally, it is possible to use a variable value as the threshold value.

Referring to FIG. 3, attention will be directed to a vector quantizer device according to a second preferred embodiment of this invention. Similar parts are again designated by like reference numerals and are similarly operable with likewise named signals.

Generally speaking, the predicting unit 37 comprises first through N-th predictors and a predicted vector selector 49 for producing the predicted vector in response to the input vector sequence, where N represents a predetermined integer. It will be surmised merely for simplicity of the description that the first through the N-th predictors have a common prediction degree of the predetermined number P.

In the example being illustrated, the predetermined integer is equal to two. Each of first and second predictors 37(1) and 37(2) is supplied with the first through the P-th output vectors from the output switch 33.

Again generally speaking, an n-th predictor 37(n) comprises as an n-th coefficient memory and an n-th arithmetic circuit the coefficient memory 39 and the arithmetic circuit 43 described in connection with FIG. 2, where n is variable between 1 and N, both inclusive. The output vector memory 41 is common to the first through the N-th predictors, such as 37(1) and 37(2), and holds at the t-th time instant the first through the P-th output vectors.

In the n-th predictor, the coefficient memory 39 keeps n-th primary through P-ary coefficient matrices A(n1) to A(nP). Such coefficient matrices are preliminarily designed for the first through the N-th predictors, such as 37(1) and 37(2), to be different from one predictor to another predictor.

Calculating at the t-th time instant an n-th summation of n-th primary through P-ary products with an n-th p-ary product calculated in connection with an n-th p-ary coefficient matrix A(np) and the p-th output vector Y(t−p), where p is variable between 1 and P, both inclusive, the arithmetic circuit 43 of the n-th predictor produces an n-th predicted signal Z(tn) predictive of the t-th input vector with quantization. At the t-th time instant, the selector 39 selects as the t-th predicted vector Z(t) for delivery to the predicted vector quantizer 13 and to the control or judging circuit 35 one of such first through N-th predicted signals that has a shortest distance relative to the t-th input vector. The n-th summation is given by an equation:

$$Z(tn) = \sum_{p=1}^{P} A(np)Y(t-p).$$

Turning to FIG. 4, taken into consideration will be a vector quantizer device according to a third preferred embodiment of this invention. Once again, similar parts are designated by like reference numerals and are similarly operable with likewise named signals. The predicting unit 37 is not different from that described in conjunction with FIG. 2.

Collectively as the predicted vector quantizer 13, the vector quantizer device comprises first through M-th vector quantizers, where M represents a predetermined natural number. In order to select at a time as the selected quantizer one of the input vector quantizer 11 and the first through the M-th vector quantizers, the control or judging circuit 35 produces from time to time, as the control signal, primary and first through M-th secondary control signals. Responsive to the primary control signal and to an m-th secondary control signal, where m is variable between 1 and M, both inclusive, the input and the output switches 31 and 33 select the input vector quantizer 11 and an m-th vector quantizer, respectively, as the selected quantizer. When selected, the m-th vector quantizer produces an m-th secondary quantized vector.

The control or judging circuit 35 is substantially identical in structure with that described in connection with FIG. 2. The judging comparator 47 is supplied collectively as the threshold value Th simultaneously with first through M-th threshold values. Among the first through the M-th threshold values, the first threshold value is the greatest. The second through the M-th threshold values are successively smaller. The judging comparator 47 compares the prediction error vector successively with the first through the M-th threshold values.

When the prediction error vector is greater than the first threshold value, the primary control signal is produced. When the prediction error vector is smaller than the M-th threshold value, the M-th secondary control signal is produced. When the prediction error vector is greater than an m-th threshold value and is equal to or smaller than an (m+1)-th threshold value except for a case where m is equal to M, the m-th secondary control signal is produced.

In the example being illustrated, the predetermined natural number is equal to two. As a consequence, the predicted vector quantizer 13 comprises first and second vector quantizers 13(1) and 13(2). The control circuit 35 produces the primary control signal for selection of the input vector quantizer 11, the first secondary control signal for selection of the first vector quantizer 13(1), and the second secondary control signal for selection of the second vector quantizer 13(2).

Referring to FIGS. 3 and 4, it is possible to implement a vector quantizer device according to a fourth preferred embodiment of this invention. In an example, this vector quantizer device comprises the predicting unit 37 of FIG. 3 and the control or judging circuit 35 described in connection with FIG. 4.

Reviewing FIG. 1, it should be noted that the vector quantizer device is revealed in the Japanese Patent Prepublication to comprise a prediction error vector quantizer in place of the predicted vector quantizer 13 of the type described in connection with FIG. 2. More particularly, the prediction error vector quantizer quantizes a prediction error vector into a quantized prediction error vector, which is referred to hereinabove as the second or the secondary quantized vector merely for convenience of the description. The vector quantizer device of the prepublication consequently necessitates use of a specific vector dequantizer described and claimed in the prepublication.

While this invention has thus far been described in specific conjunction with a few preferred embodiments thereof, it will now be readily possible for one skilled in the art to put this invention into practice in various other manners. Above all, it is possible to use in the predicting unit 37 described in conjunction with FIG. 3 first through N-th prediction degrees P(1), P(2), . . . , and P(N) which are different from one another. In such an event, a maximum of the first through the N-th prediction degree should be understood as the prediction degree described before with some of the prediction coefficient matrices of smaller prediction degrees deemed to be zero matrices. The predetermined integer N may be greater than, equal to, or less than the predetermined natural number M. In the control circuit 35 described with reference to FIG. 4, the primary control signal may be produced when the prediction error vector is not greater than the first threshold value. In correspondence the m-th secondary control signal may be produced when the prediction error vector is not smaller than the m-th threshold value and is not greater than the (m+1)-th threshold value. Furthermore, it is possible to use, as the first through the P-th output vectors at the t-th time instant, (t−q(1))-th, (t−q(2))-th, . . . . (t-q(p))-th, . . . . , and (t-q(P))-th output vectors, where q(p) represents a natural number which is preselected in consideration of correlations between consecutive ones of the input vectors with q(1) preselected in view of the time interval between two consecutive ones of the time instants and a speed of operation of the vector quantizer devices. For example, a strong correlation is known between the picture element blocks of a frame or a field interval unless a scene change takes place between the frame or the field interval.

What is claimed is:

1. A vector quantizing method for quantizing an input vector sequence into an output sequence of output vectors, comprising the steps of:

predicting at each time instant a current input vector as a predicted vector in response to a predetermined number of said output vectors produced before said time instant;

producing a control signal in response to said current input vector and said predicted vector;

selecting one of a step of quantizing said current input vector of said input vector sequence and quantizing said predicted vector using said current input vector, said step of selecting being performed in response to said control signal;

quantizing said current input vector of said input vector sequence into a primary quantized vector in accordance with said step of selecting;

quantizing said predicted vector into a secondary quantized vector using said current input vector in accordance with said step of selecting; and outputting one of said primary quantized vector and said secondary quantized vector as said output sequence of said output vectors at said time instant, said step of outputting being performed in response to said control signal.

2. A vector quantizing method as claimed in claim 1, wherein said step of producing said control signal comprises the steps of:

calculating at said time instant a prediction error vector based on said current input vector and said predicted vector; and comparing said prediction error vector with a threshold value to produce said control signal;

wherein during said step of selecting, said step of quantizing said predicted vector using said current input vector will be selected so that said secondary quantized vector will be output when said prediction error vector is smaller than said threshold value and said step of quantizing a current input vector of said input vector sequence will be selected so that said primary quantized vector will be output when said prediction error vector is smaller than said threshold value.

3. A vector quantizing method as claimed in claim 1, wherein said step of predicting is further responsive to said input vector sequence and comprises the steps of:

producing at said time instant first through N-th predicted signals in order to predict said current input vector in response to said predetermined number of output vectors produced before said time instant, where N represents a predetermined integer; and selecting as said predicted vector one of said first through said N-th predicted signals that is most similar to said current input vector.

4. A vector quantizing method as claimed in claim 1, wherein said step of quantizing said predicted vector comprises the step of quantizing said predicted vector into one of a plurality of quantized vectors, comprising first through M-th secondary quantized vectors, in response to said input vector sequence, where M represents a predetermined natural number;

wherein said step of producing a control signal comprises the step of producing a control signal having one of primary and first through M-th secondary values;

wherein said step of selecting comprises the step of selecting one of said step of quantizing said current input vector and said step of quantizing said predicted vector based on a value of said control signal; and wherein said step of outputting comprises the step of outputting said one of said plurality of quantized vectors as said output sequence of said output vectors at said time instant when said step of quantizing said predicted vector is selected based on said value of said control signal.

5. A vector quantizing method as claimed in claim 4, wherein said step of producing a control signal comprises the steps of:

calculating a prediction error vector based on said current input vector and said predicted vector at said time instant; and comparing said prediction error vector successively with first through M-th threshold values, which decrease successively from said first threshold value to said M-th threshold value; and producing said control signal in accordance with said step of comparing, said control signal having said primary value when said prediction error vector is greater than said first threshold value, said M-th secondary value when said prediction error vector is not greater than said M-th threshold value, and an m-th secondary value of said first through M-th threshold values when said prediction error vector is greater than a corresponding m-th threshold value of said first through M-th threshold values and is not greater than an (m+1)-th threshold value of said first through M-th threshold values, where m is variable between 1 and (M−1), both inclusive.

6. A vector quantizing method as claimed in claim 4, wherein said step of predicting is further responsive to said input vector sequence and comprises the steps of:

producing at said time instant first through N-th predicted signals predictive of said current input vector at said time instant in response to said predetermined number of output vectors produced before said time instant, where N represents a predetermined integer; and selecting as said predicted vector one of said first through said N-th predicted signals that is most similar to said current input vector.

7. A vector quantizing device for quantizing an input vector sequence into an output sequence of output vectors, comprising;

an input vector quantizing circuit for quantizing a current input vector of said input vector sequence into a primary quantized vector;

a predicting circuit for predicting at each time instant said current input vector as a predicted vector in response to a predetermined number of said output vectors produced before said time instant;

a predicted vector quantizing circuit for quantizing said predicted vector into a secondary quantized vector using said current input vector;

a control circuit for producing a control signal in response to said current input vector and said predicted vector;

an input switch responsive to said control signal for supplying said current input vector to one of said input vector quantizing circuit and said predicted vector quantizing circuit; and a device output circuit comprising an output switch responsive to said control signal for outputting one of said primary quantized vector and said secondary quantized vector as said output vector at said time instant.

8. A vector quantizing device as claimed in claim 7, wherein said control circuit comprises:

a calculating circuit for calculating at said time instant a prediction error vector between said current input vector and said predicted vector;

a comparing circuit for comparing said prediction error vector with a threshold value to produce said control signal having one of a primary and secondary value, said control signal having said primary value when said prediction error vector is greater than said threshold value and said secondary value when said prediction error vector is not greater than said threshold value;

said input switch supplying said input vector sequence to said input vector quantizing circuit when said control signal has said primary value and supplying said input vector sequence to said predicted vector quantizing circuit when said control signal has said secondary value;

said output switch outputting said primary quantized vector when said control signal has said primary value and outputting said secondary quantized vector when said control signal has said secondary value.

9. A vector quantizing device as claimed in claim 7, wherein said predicting circuit is further responsive to said input vector sequence and comprises:

first through N-th predictor circuit elements for outputting first through N-th predicted signals predictive of said current input vector at said time instant in response to a predetermined number of the output vectors produced before said time instant; and a selector responsive to said input vector sequence for selecting as said predicted vector at said time instant one of said first through said N-th predicted signals that is most similar to said current input vector.

10. A vector quantizing device as claimed in claim 7, wherein said input vector quantizing circuit comprises:

an input vector codebook for storing a plurality of input vector quantization code vectors; and an input code vector selector circuit, responsive to said input vector sequence and said input vector quantization code vectors, which selects as said primary quantized code vector one of said input vector quantization code vectors that has a shortest distance relative to said current input vector; and wherein said predicted vector quantizing circuit comprises:

a subtractor circuit for calculating at said time instant a prediction error vector based on said current input vector and said predicted vector:

a prediction error codebook for storing a plurality of prediction error quantization code vectors;

a prediction error code vector selector circuit for selecting as a quantized error vector one of said prediction error quantization code vectors that has a shortest distance relative to said prediction error vector; and an adder circuit for calculating as said secondary quantized vector a sum of said quantized error vector and said predicted vector.

11. A vector quantizing device as claimed in claim 7, wherein said predicted vector quantizing circuit comprises:

first through M-th quantizer circuits responsive to said input vector sequence for quantizing said predicted vector into one of a plurality of secondary quantized vectors including first through M-th secondary quantized vectors, where M represents a predetermined natural number;

said control circuit producing said control signal having one of said primary and first through M-th secondary values;

said input switch supplying said current input vector to one of said input vector quantizing circuit and said first through M-th quantizer circuits in response to said control signal based on a value of said control signal;

said output switch being responsive to said control signal and outputting one of said primary and said first through said M-th secondary quantized vectors based on said value of said control signal.

12. A vector quantizing device as claimed in claim 11, wherein said control circuit comprises:

a calculating circuit for calculating at said time instant a prediction error vector based on said current input vector and said predicted vector, and a comparing circuit for comparing said prediction error vector with first through M-th threshold values, which decrease in value from said first threshold value to said M-th threshold value, in order to produce said control signal having one of said primary and first through M-th secondary values, said control signal having said primary value when said prediction error vector is greater than said first threshold value, said M-th secondary value when said prediction error vector is not greater than said M-th threshold value, and an m-th secondary value of said first through M-th secondary values when said prediction error vector is greater than an m-th threshold value of said first through M-th threshold values and is not greater than an (m+1)-th threshold value of said first through M-th threshold values, where m is variable between 1 and (M-1), both inclusive.

13. A vector quantizing device as claimed in claim 11, wherein said predicting circuit is further responsive to said input vector sequence and comprises:

first through N-th predictor circuit elements for predicting first through N-th predicted signals predictive of said current input vector with quantization at said time instant in response to a predetermined number of the output vectors produced before said time instant; and a selector responsive to said input vector sequence for selecting as said predicted vector at said time instant one of said first through said N-th predicted signals that is most similar to said current input vector.

* * * * *